United States Patent

[11] 3,575,053

[72] Inventor John C. Telinde
Westminster, Calif.
[21] Appl. No. 744,106
[22] Filed July 11, 1968
[45] Patented Apr. 13, 1971
[73] Assignee McDonnell Douglas Corporation

[54] CRYOGENIC LINEAR TEMPERATURE SENSOR
9 Claims, 17 Drawing Figs.
[52] U.S. Cl. .................................................. 73/362, 338/25
[51] Int. Cl. .................................................. G01k 7/18, H01c 3/00
[50] Field of Search .......................................... 73/362 (R); 338/25, 28

[56] References Cited
UNITED STATES PATENTS
1,192,911  8/1916  Leeds ........................... 338/25
2,098,650 11/1935  Stein ............................ 338/25-X
2,395,192  2/1946  Ostergren ..................... 73/362(R)-X
3,354,716 11/1967  Wiebe et al. .................. 73/344-X OTHER REFERENCES
Lange, A. L. Handbook of Chemistry. Page 596. Handbook Publishers Inc. Sandusky, Ohio, 1941 Copy in Group 280.

Primary Examiner—Louis R. Prince
Assistant Examiner—Frederick Shoon
Attorneys—Walter J. Jason, Donald L. Royer and D. N. Jeu ABSTRACT: Cryogenic temperature sensor having a linear resistance response down to almost absolute zero. Sensor includes a manganin element and a nickel element connected in a series combination wherein there is of the order of five times as much manganin as nickel (in resistance). The manganin-nickel temperature sensor may be used in a bridge circuit to provide linear output indications of the temperatures sensed by the sensor. Different sensor configurations having specific features and advantages were developed to reduce sensor sensitivity to strain and errors due to temperature gradients existing across a sensor, among other benefits.

INVENTOR.
JOHN C. TELINDE

INVENTOR.
JOHN C. TELINDE
BY
- AGENT -

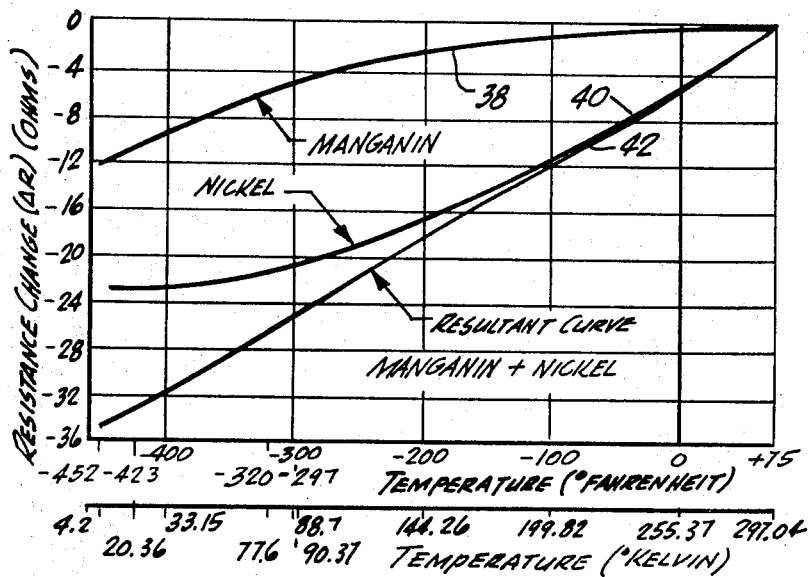
Fig. 5
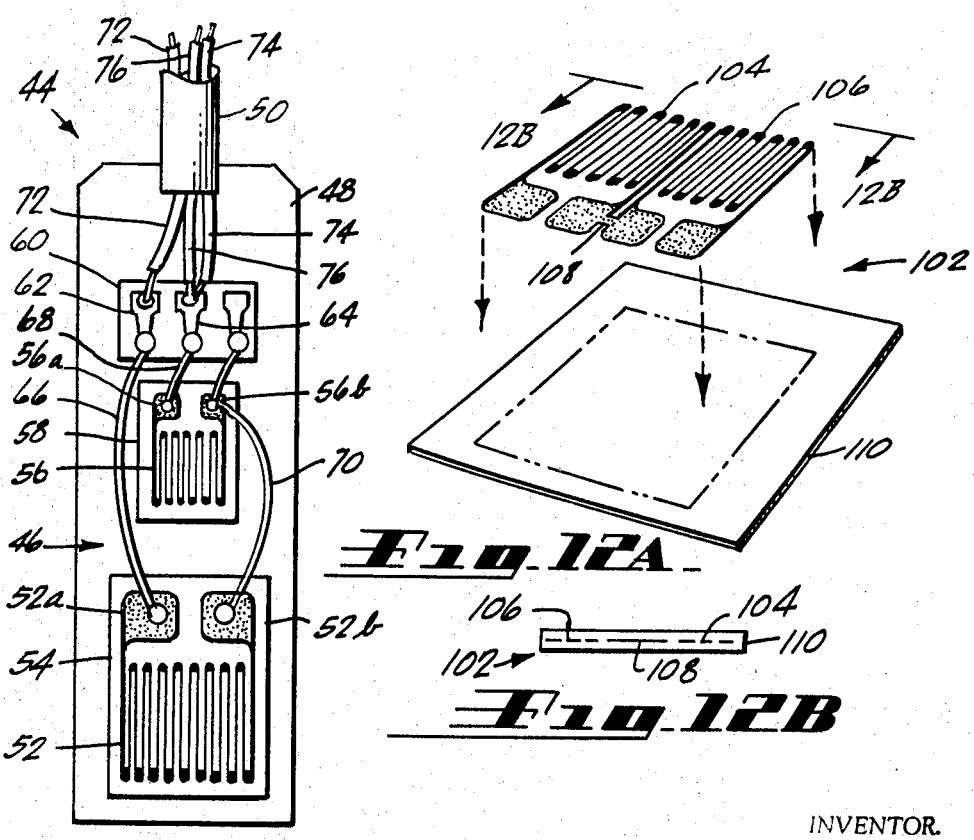
Fig. 6
Fig. 12A
Fig. 12B
INVENTOR.
JOHN C. TELINDE

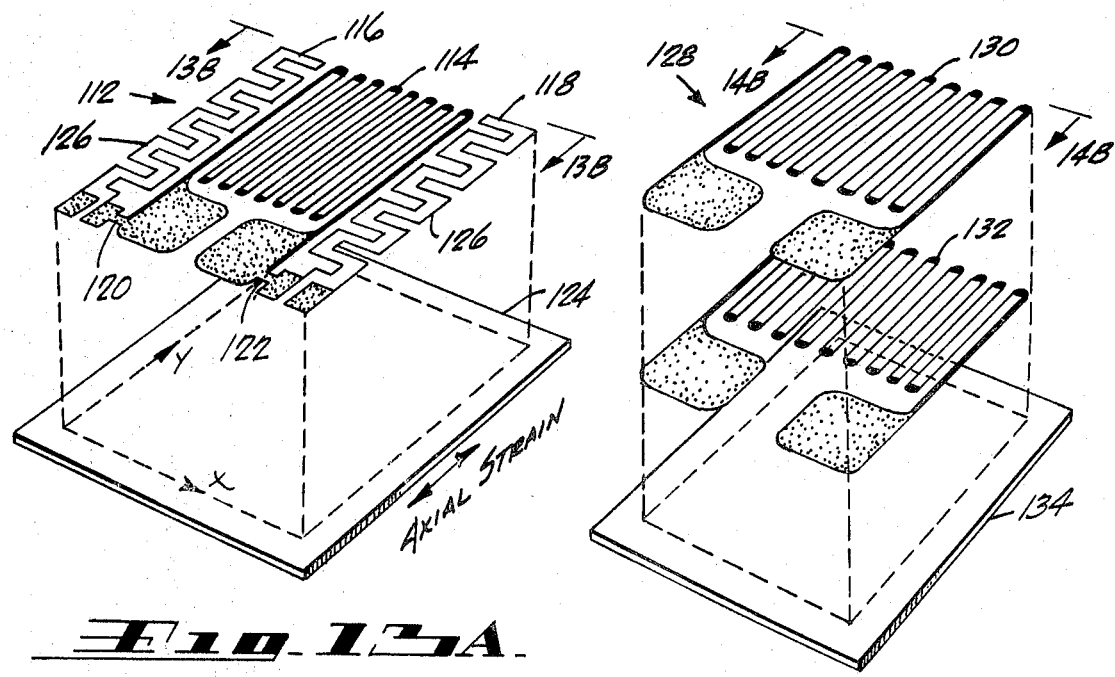
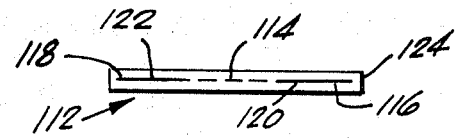
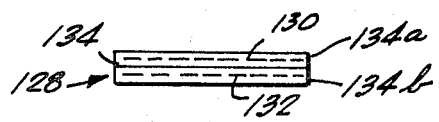
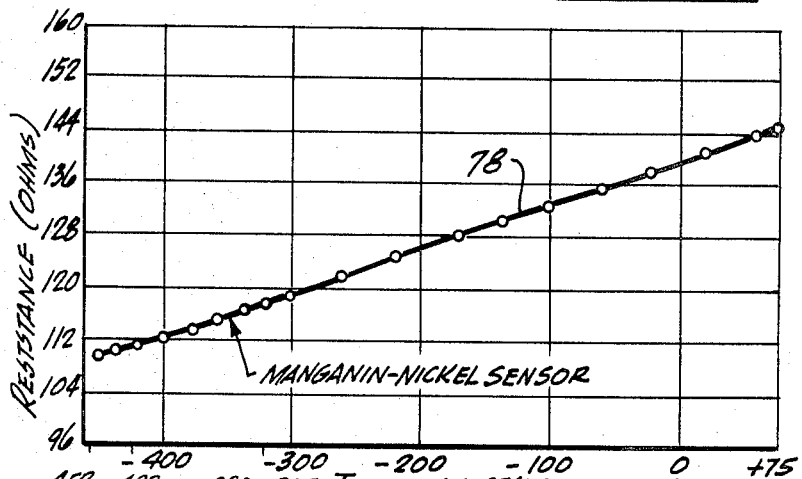
INVENTOR.
JOHN C. TELINDE
BY
- AGENT -

INVENTOR.
JOHN C. TELINDE
BY
—AGENT—

CRYOGENIC LINEAR TEMPERATURE SENSOR

BACKGROUND OF THE INVENTION

My present invention relates generally to the field of cryogenics and, more particularly, to a cryogenic temperature sensor which has a linear response from well over at least 366.4° K. (200° F.) down to almost absolute zero, 0° K.(−459.6° F.).

The noun "cryogenics" is derived from a combination of the Greek words "kryos" and "genes" meaning icy-cold and producing, respectively. Thus, cryogenics is the science pertaining to the production and effects of very low temperatures, and is based upon the application of various refrigeration techniques. By a suitable refrigeration process, for example, and the use of the Dewar method of vacuum insulation (as embodied in double-walled containers such as Thermos bottles), adequate quantities of liquid air, nitrogen and hydrogen in a static condition for useful purposes can be obtained. The boiling points of liquid air, nitrogen and hydrogen are respectively −318° F., −320° F. and −423° F., for example. Lower temperatures to within a few tenths of a degree of absolute zero can be provided through the use of liquid helium which has a boiling point of −452° F. Between its boiling point of −452° F. and −455.8° F., liquid helium is known as helium I which behaves as other liquids. On further cooling to below −455.8° F., liquid helium is known as helium II and becomes a so-called "superfluid" which appears to flow without friction and will flow through the most minute pores that are impervious to any other known liquid. If helium II is cooled to −456.2° F. at a pressure of 440 p.s.i., it is then changed into a transparent, crystalline solid which is tough enough to be hammered. However, pressure (over 25 atmospheres) is required to transform liquid helium to a solid.

Of course, liquefied gases such as nitrogen, hydrogen and helium are now extensively used for many purposes, and involve temperatures below −300° F. down to almost absolute zero (−459.6° F.), as is well known. For example, liquid nitrogen is widely used in food freezing, and the inert properties of liquid helium make it highly desirable for use in precooling rocket engines utilizing liquid hydrogen as a fuel (with liquid oxygen as an oxidizer). Liquid helium is the only known substance which can provide a safe, extremely cold bath for cooling masers in ultrasensitive radars, and for cooling certain metals to produce superconductivity therein. Accurate temperature measurements are obviously necessary in such processes and systems involving extremely low temperatures, but very expensive and complex equipment is presently required since a cryogenic temperature sensor having a linear response below approximately −300° F. is not either known or known to be available prior to this invention.

SUMMARY OF THE INVENTION

Briefly, and in general terms, my invention is initially based upon the discovery of the extremely unlikely condition (probably 10 million to 1 against such occurrence) wherein manganin, a material not normally used for temperature sensing and a rather little known alloy, was investigated and discovered when its resistance versus temperature characteristic was plotted to have an almost perfect inverse curve to that of pure nickel. After an analysis of the two curves down to −452° F., it appeared practical to combine the two materials, manganin and nickel, in series with a linear characteristic of resistance versus temperature resulting from such combination. It was then found by further experimentation that with approximately five times as much manganin as nickel (in resistance) and the use of a linear bridge circuit, it was possible to obtain a linear relationship of output indication with temperature down to liquid helium temperatures (−452° F. and lower). The experiments also indicated that the relationship would continue to be linear down to almost absolute zero (−459.6° F.). Other characteristics of the invention were investigated, and the manganin-nickel temperature sensor was found to have many ideal characteristics for a surface-mounted cryogenic temperature sensor. Different configurations and arrangements of the manganin-nickel temperature sensor and of its components were also developed having specific features and advantages.

BRIEF DESCRIPTION OF THE DRAWINGS

My invention will be more fully understood, and other features and advantages thereof will become apparent, from the following description of certain characteristics and exemplary embodiments of the invention. The description is to be taken in conjunction with the accompanying drawings, in which:

FIG. 5 is a graph showing plots of resistance change versus temperature curves for manganin, nickel and manganin plus nickel;

FIG. 6 is a front elevational face view of a first illustrative configuration of the manganin-nickel temperature sensor constructed in accordance with this invention;

FIG. 7 is a graph showing a plot of resistance versus temperature measurements for a manganin-nickel temperature sensor constructed according to this invention;

FIG. 12A is an exploded perspective view of a second illustrative configuration of the manganin-nickel temperature sensor;

FIG. 12B is a sectional view of the encapsulated second temperature sensor as taken along the line 12B–12B indicated in FIG. 12A;

FIG. 13A is an exploded perspective view of a third illustrative configuration of the manganin-nickel temperature sensor;

FIG. 13B is a sectional view of the encapsulated third temperature sensor as taken along the line 13B–13B indicated in FIG. 13A;

FIG. 14A is an exploded perspective view of a fourth illustrative configuration of the manganin-nickel temperature sensor; and FIG. 14B is a sectional view of the encapsulated fourth temperature sensor as taken along the line 14B–14B indicated in FIG. 14A.

DESCRIPTION OF THE PRESENT EMBODIMENTS

Figure 1:
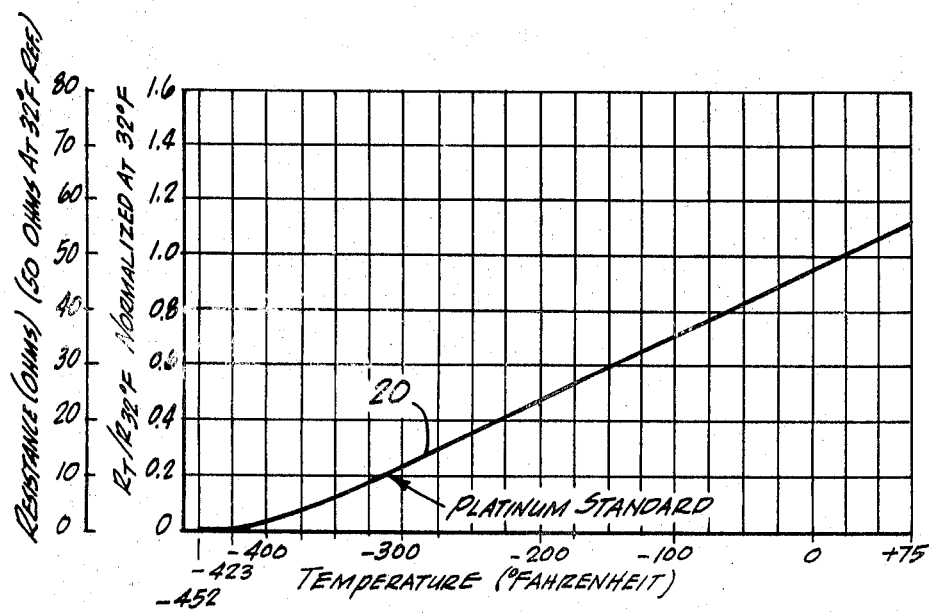
FIG. 1 is a graph showing the resistance versus temperature characteristic for a platinum temperature sensor plotted from room temperature down into the cryogenic temperatures.

FIG. 1 is a graph showing the resistance versus temperature characteristic of a platinum cryogenic temperature sensor which is normally used for extreme high accuracy temperature measurements. Resistance of the platinum sensor is plotted against its temperature to produce curve 20 which extends from room temperature (75° F.) down into the cryogenic temperatures (−452° F.). The temperature scale in degrees Fahrenheit is indicated along the abscissa axis, and the resistance scale in ohms is indicated the ordinate axis of the graph of FIG. 1. Additionally, a normalized scale, $R_T/R_{32°F}$, is shown along the ordinate axis. This normalized scale is based upon the ratio of the platinum sensor's resistance in ohms at any particular temperature to its resistance in ohms at the accepted reference temperature of 32° F. (ice point) for platinum. The resistance of the platinum sensor at 32° F. is 50 ohms, as can be noted from the graph of FIG. 1.

Platinum has been the most widely used material in temperature sensors for cryogenic temperature measurements, and has been adopted as the international temperature standard for measurements above −297° F. (boiling point of liquid oxygen) because of its response linearity and material stability. At cryogenic temperatures below −297° F., however, platinum becomes exceedingly nonlinear in response, and the slope of the resistance versus temperature curve 20 becomes almost zero at its lower end as can be seen from the graph of FIG. 1. The lower part of the curve 20 has been described by suitable equations having appropriately adjusted parameters. Implementation of a suitable system to perform the relationships defined by such equations requires relatively complex and high-accuracy equipment. Thus, very expensive and rather unwieldy equipment must be employed to measure temperatures below −297° F. with any degree of accuracy. A platinum sensor with a room temperature resistance of 54 ohms has a resistance of 0.03 ohm at −452° F. Such low values of resistance are extremely difficult to measure and require the use of a readout circuit as a Mueller bridge, which is manually operated. This type of equipment is not easily adaptable for use in other systems and, for example, clearly does not lend itself to normal connection into an automatic recording system or the like.

Figure 2:
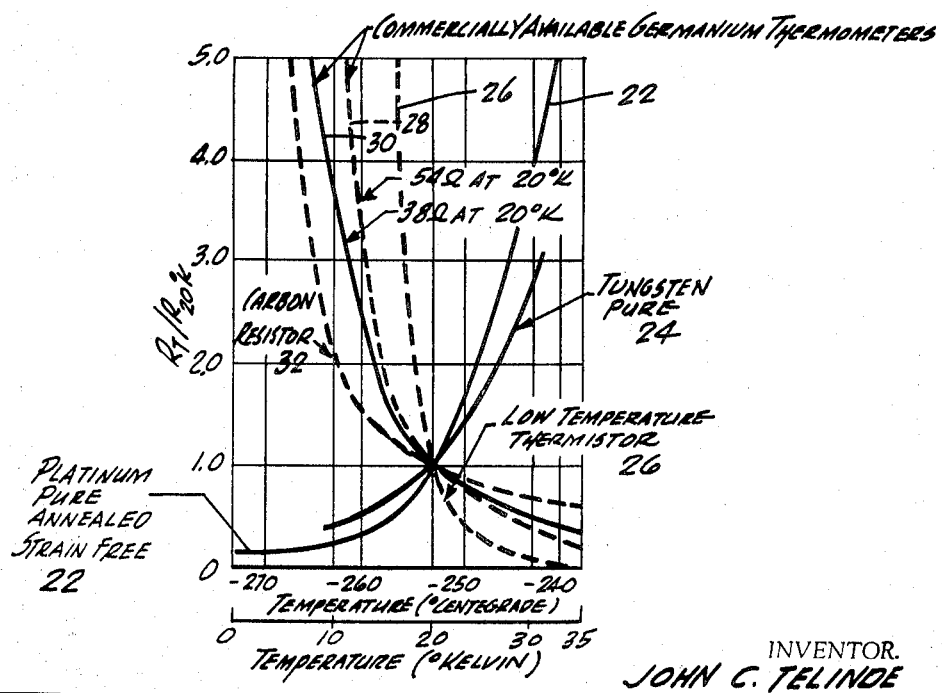
FIG. 2 is a graph showing the resistance and temperature relationships of various resistance-type temperature sensors in their low temperature ranges.

FIG. 2 is a graph showing different resistance and temperature relationships of various resistance-type temperature sensors in their low temperature ranges. Temperatures scales in degrees Centigrade and Kelvin are indicated along the abscissa axis, and a resistance scale normalized at 20° K. is indicated along the ordinate axis of the graph. Curve 22 for a pure, annealed, strain-free platinum temperature sensor illustrates the great nonlinearity thereof in its low temperature response range. Pure tungsten is also used for cryogenic temperature measurements but, like platinum, is very nonlinear at the lower cryogenic temperatures as indicated by curve 24. Curves 26, 28, 30 and 32 are response characteristics for a low temperature thermistor sensor, a 54 ohms-reference commercially available germanium thermometer, a 38 ohms-reference commercially available germanium thermometer and a carbon resistor sensor, respectively. It is apparent from the curves 26, 28, 30 and 32 that these four materials are nonlinear in response in their low temperature ranges, although they are reversed in curvature (relative to a vertical axis) to that of platinum.

Much work has been done with semiconductors for use in the cryogenic temperature ranges. Germanium appears to have the best sensitivity and repeatability, but germanium has a very nonlinear response as indicated by the curves 28 and 30 in the graph of FIG. 2. Gallium arsenide has shown some promise; nevertheless, its response curve is also highly nonlinear at the low cryogenic temperature ranges. Thermocouples, on the other hand, have such a low output in the cryogenic region that they are impractical for use in cryogenic temperature sensors. A sensor fabricated of a gold-cobalt alloy was found to provide the highest output, but suffers from irregular and unacceptable errors due to composition inhomogeneity. As a possible solution, a platinum-iridium alloy sensor was fabricated and investigated.

Figure 3:
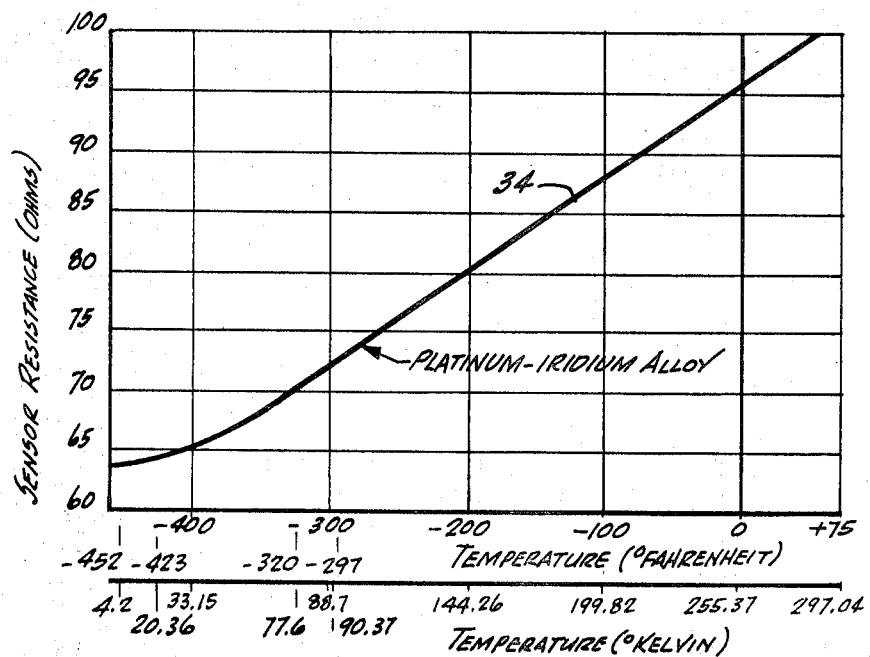
FIG. 3 is a graph showing the resistance versus temperature characteristic of a platinum-iridium alloy temperature sensor plotted from room temperature down into the cryogenic temperatures.

FIG. 3 is a graph showing a resistance versus temperature curve 34 of the investigated platinum-iridium alloy sensor. It can be seen that the response of the sensor is linear down to approximately −350° F. and then becomes nonlinear much like the characteristic shown in FIG. 1 for a pure platinum sensor. However, the resistance of the platinum-iridium sensor is much higher than that of the platinum sensor at the lower cryogenic temperatures. Attempts to develop an alloy using various combinations and proportions of different materials to produce a temperature sensor having a linear response down through the lower cryogenic temperatures have been unsuccessful since the turn of the century.

In the process of evaluating the various alloys for their resistance versus temperature characteristics, it became apparent that if a suitable alloy had an inverse resistance versus temperature characteristic to that of another suitable alloy or material, by combining these two materials in a series combination and in the right proportions a linear relationship could result. When manganin, an alloy not normally used for temperature sensing was being investigated for other purposes, it was discovered that it had an almost perfect inverse resistance versus temperature characteristic to that of pure nickel.

Figure 4:
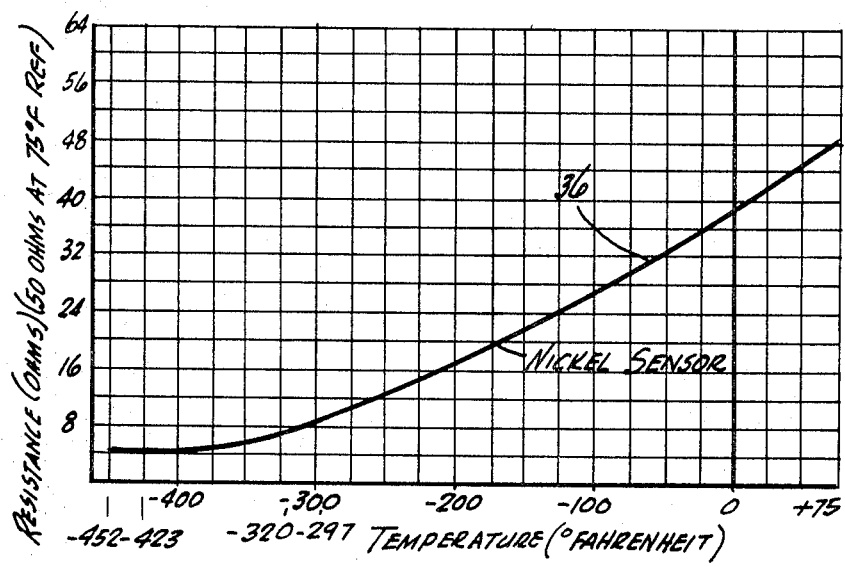
FIG. 4 is a graph showing the resistance versus temperature characteristic of a nickel temperature sensor plotted from room temperature down into the cryogenic temperatures.

FIG. 4 is a graph illustrating the resistance versus temperature characteristic of a pure nickel sensor. The sensor has a resistance of, for example, 50 ohms at its standard reference temperature of 75° F. (room temperature). It is noted that the curve 36 is not linear to any significant extent throughout its entire plotted length. Obviously, it would appear virtually impossible to find or produce any alloy which has or would have a response characteristic that is almost the exact inverse of the one for pure nickel. After an analysis of the response curves for manganin and pure nickel to −452° F., it appeared practical to combine the two materials in series. However, much experimentation was required to determine the correct proportions of the two materials to use to produce a resultant sensor having a fully linear resistance versus temperature characteristic down to the temperature of liquid helium (−452° F.).

FIG. 5 is a graph showing three curves 38, 40 and 42 which are response curves for temperature sensors of manganin, nickel and the series combination of manganin and nickel, respectively. It is observed that both the manganin and nickel curves 38 and 40 are nonlinear but the resultant curve 42 is substantially linear down to −452° F. Experimental data has indicated that the resultant curve 42 may continue to be substantially linear down to almost absolute zero (−459.6° F.). It should be noted that slight modifications of the composition and/or proportion of each of the manganin and nickel components of a manganin-nickel temperature sensor may improve the linearity of the resultant curve 42. Suitable work hardening and heat treatment of the components can also further improve the linearity of the resultant curve 42.

FIG. 6 is an elevational, frontal face view of a probe 44 mounting a first illustrative configuration or embodiment of a manganin-nickel temperature sensor 46 constructed according to this invention. The probe 44 includes an end plate 48 which is suitably secured to the lower end of a tube 50. A manganin grid element 52 is encapsulated in a thin film 54 of, for example, epoxy resin and suitably affixed to the face of the end plate 48 of the probe 44. Similarly, a nickel grid element 56 is also encapsulated in a thin film 58 of epoxy resin and suitably affixed to the face of the end plate 48 close to the manganin grid element 52. A terminal strip 60 including terminals 62 and 64 thereon is suitably affixed to the face of the end plate 48. The grid end 52a of the element 52 is connected to the terminal 62 by a wire 66. The grid end 56a of the element 56 is similarly connected to the terminal 64 by a wire 68. The grid ends 52b and 56b are connected together by a wire 70. Finally, lead 72 is connected to terminal 62, and two leads 74 and 76 are connected to terminal 64. All three leads 72, 74 and 76 extend from the sensor 46 up through the tube 50.

FIG. 7 is a graph showing a plot of sensor resistance versus temperature for a manganin-nickel temperature sensor similar to the sensor 46 illustrated in FIG. 6. Of course, curve 78 shown in the graph of FIG. 7 is essentially the same for practically all configurations or embodiments of the manganin-nickel temperature sensor. It can be seen that a substantially linear response curve 78 is obtained from at least room temperature (75° F.) down to that of liquid helium (−452°F.). The sensor 46 shown in FIG. 6 includes grid elements 52 and 56 which can be made of wire, foil or vacuum-deposited film. The grid elements 52 and 56 are, for example, made of foil of approximately 0.0001 inch thickness and have grid strands of about 0.005 inch in width. The foils are normally placed on a matrix of a few strands of high temperature Fiberglas and encapsulated in a thin film of epoxy resin. The total thickness of the final product is only about 0.001 inch. The grid element 52 is illustratively made of manganin having an essential nominal chemical composition by weight of the order of 12 percent manganese, 4 percent nickel and 84 percent copper. The grid element 56 similarly has an essential nominal composition by weight of the order of 99.9 percent pure nickel, for example. In the sensor 46, the manganin grid element 52 has a resistance of 121 ohms and the nickel grid element 56 has a resistance of 25 ohms, for example. The sensor 46 has a very low strain sensitivity since the (positive) strain sensitivity of manganin tends to cancel the strain sensitivity of nickel. This can be a very important characteristic in a cryogenic temperature sensor.

Figure 8:
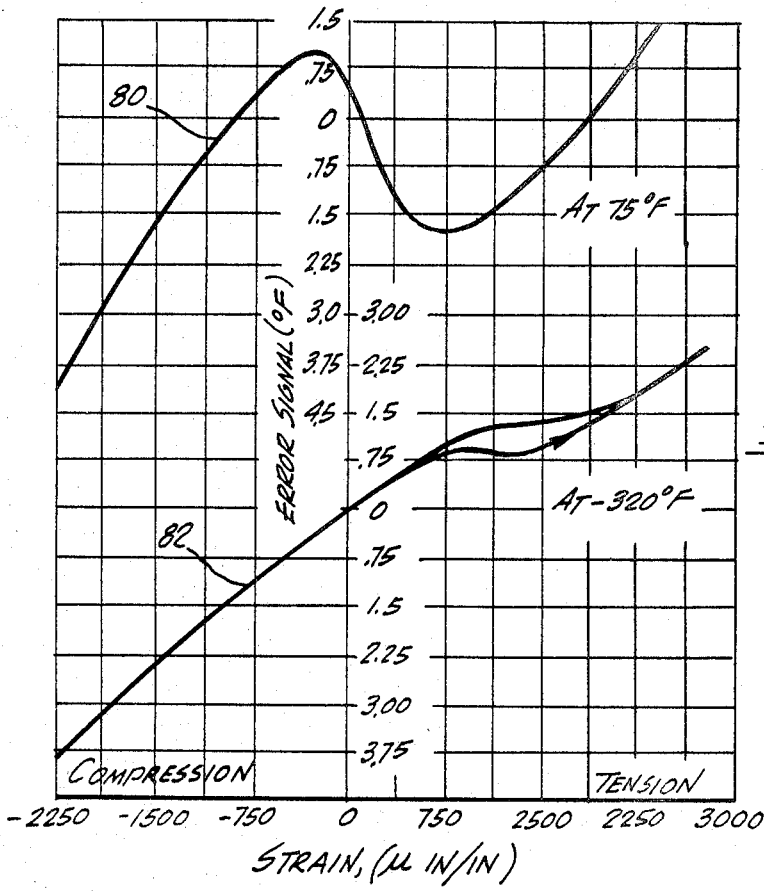
FIG. 8 is a graph including two plots illustrating temperature sensitivity due to strain at 75° F. and −320° F., respectively, of the manganin-nickel temperature sensor.

FIG. 8 is a graph including two curves 80 and 82 illustrating sensitivity due to strain at 75° F. and −320° F., respectively, of the manganin-nickel temperature sensor. At −750 microinch per inch strain, for example, temperature error is approximately 0.4° F. at 75° F. and approximately −1.1° F. at −320° F. Manganin and nickel grid elements similar to the elements 52 and 56 were attached to a suitable test beam (not shown) to measure strain sensitivity. The strain sensitivity of nickel is low in a compressive strain field and, since only about one-sixteenth the amount of the active sensor is nickel (25 ohms out of a total of 146 ohms, for example), the tension strain sensitivity of the manganin-nickel sensor is also low. It is noted that the curve 82 is part of a hysteresis loop which has not been fully formed. The sensor evidences good stability and repeatability. This was experimentally verified by plotting the response of two manganin-nickel sensors against each other from room temperature down to liquid helium temperature, and repeating the test with the sensors in reversed channels (positions). No inconsistency or nonrepeatability between sensors was indicated in these tests. The manganin-nickel sensor also has very good temperature response. Its temperature-tracking accuracy was, for example, fully established by tests involving extreme conditions of temperature and time.

Figure 9:
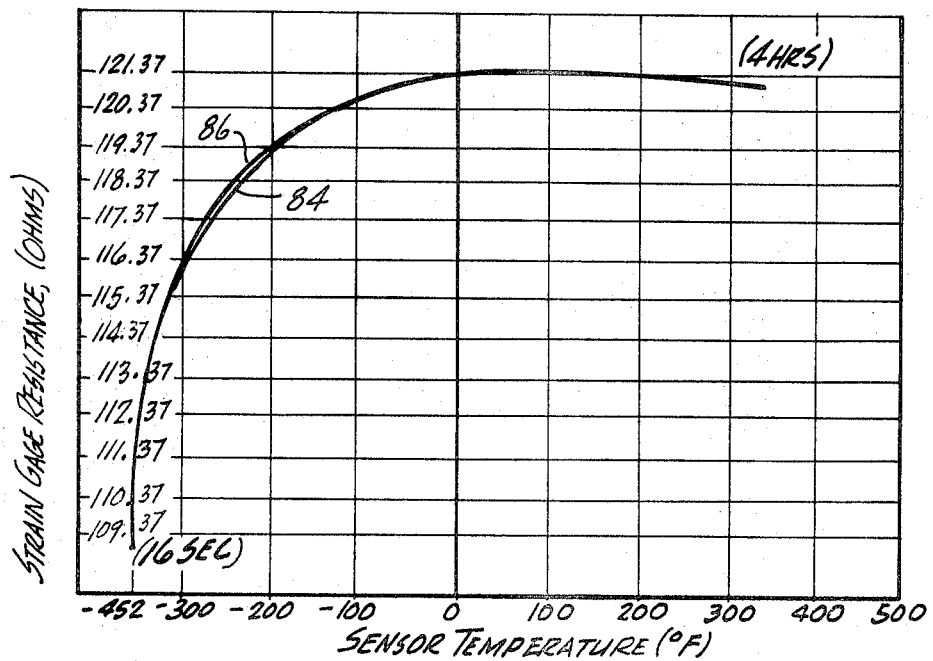
FIG. 9 is a graph showing a plot of strain gauge resistance versus the manganin-nickel sensor temperature obtained under extreme conditions to determine the accuracy of the manganin-nickel sensor for temperature tracking during the running of an apparent strain curve.

FIG. 9 is a graph showing a plot of strain gauge resistance versus the manganin-nickel sensor temperature in an apparent strain test run involving extreme conditions to determine the temperature-tracking accuracy of the sensor. A constantan strain gauge of known and established response (repeatability) and a manganin-nickel sensor were suitably installed on a test specimen for the running of an apparent strain curve. Apparent strain is defined herein as the output of a strain gauge installed on a free, unrestrained plate specimen which is subjected to temperature changes but without any mechanical strain being applied thereto. This apparent strain is due to the coefficient of expansion of the free plate and is partly canceled by the coefficient of resistance of the strain gauge material.

Since one of the best testing tools to determine if any differences exist in the test results is the use of extreme conditions, the test specimen was heated to 375° F. and then plunged into a container of liquid helium, producing a temperature change (drop) of 830° F. in approximately 16 seconds. The specimen was then allowed to warm and be heated very slowly over a relatively long period of 4 hours to 375° F. Curve 84 in the graph was produced during the rapid cooling phase of the test, and curve 86 was produced during the slow heating phase. As can be seen, the curves 84 and 86 agree very closely and the difference between them is entirely negligible. The relatively small mass and small size of the manganin and nickel elements 52 and 56 provide a temperature sensor which is highly responsive to rapid temperature changes. The curve 78 (FIG. 7) also shows that there is a change of approximately 15° F. per ohm for the sensor 46 (and other versions thereof). Thus, the manganin-nickel temperature sensor of this invention has a resistance coefficient that works well in a Wheatstone bridge circuit.

Figure 10:
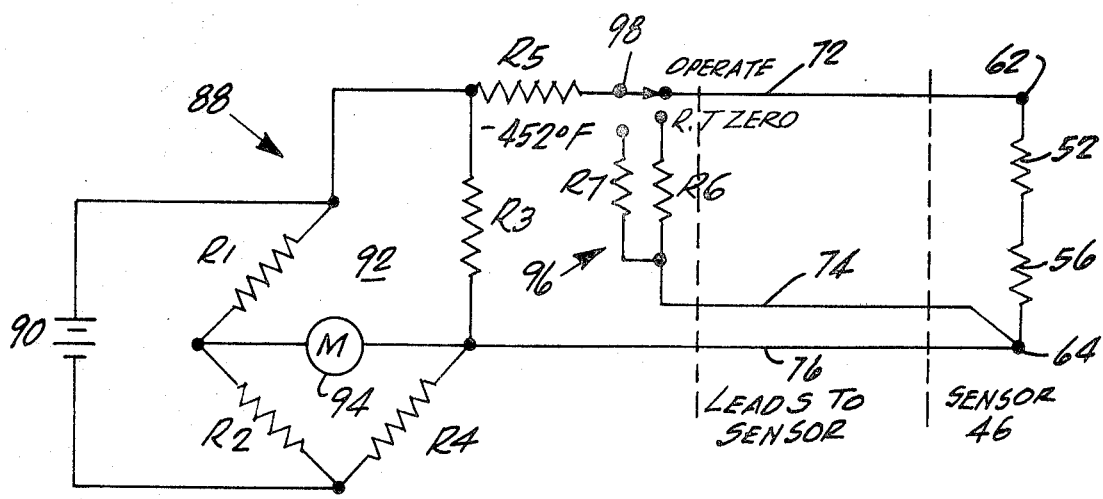
FIG. 10 is a circuit diagram of a bridge circuit which can be used with the manganin-nickel temperature sensor for providing linear output signals in conformity with the temperatures sensed by the sensor.

FIG. 10 is a circuit diagram of a bridge circuit 88 including a power supply 90 connected across the ends of a bridge 92, a readout device 94 connected across the centers of the bridge 92, a manganin-nickel temperature sensor 46 adapted to be connected across one arm of the bridge 92, and a calibration network 96 for calibrating the bridge circuit 88 to compensate for lead length to the sensor 46. The power supply 90 provides an output voltage of approximately ½ volt and the readout device 94 is a millivoltmeter, for example. Resistors R1, R2, R3 and R4 are the four arms of the bridge 92. Of course, when the pole of calibrate switch 98 is in its normal position, engaging its "operate" contact as shown, resistor R5 and grid elements 52 and 56 of the sensor 46 are connected in a series combination which is connected in parallel with the resistor R3. When the pole of switch 98 engages its contact labeled "R.T. Zero" (room temperature zero), the series combination of resistors R5 and R6 is connected in parallel with the resistor R3. Similarly, when the pole of switch 98 engages its contact labeled "−452° F." (liquid helium temperature), the series combination of resistors R5 and R7 is connected in parallel with the resistor R3. Lead 72 from the switch contact labeled "operate" is connected to terminal 62 of grid element 52, lead 74 is connected from the common junction between the calibrate resistors R6 and R7 to terminal 64 of the grid element 56, and lead 76 is connected from the common junction between the bridge resistors R3 and R4 also to the terminal 64.

In operation, the pole of the switch 98 is first positioned to engage its "R.T. Zero" contact and the readout device 94 indication is correspondingly calibrated for room temperature. Similarly, when the pole of the switch 98 is positioned to engage its "−452° F." contact, the readout device 94 indication is also correspondingly calibrated for liquid helium temperature. The room temperature resistance of the manganin element 52 is 121 ohms and the room temperature resistance of the nickel element 56 is 25 ohms, for example. Thus, the resistance of the resistor R6 would be the sum of the resistances of the series elements 52 and 56, or 146 ohms. In like manner, the resistance of the liquid helium temperature resistor R7 is, for example, 110 ohms. Since the resistance of the leads 74 and 76 are included in series with either of the resistors R6 or R7, it is apparent that calibration with the circuit of FIG. 10 compensates for lead length to the sensor 46.

It is noted that the room temperature resistance of the manganin-nickel temperature sensor 46 (total resistance or combined amounts of the series manganin and nickel elements 52 and 56) can be larger or smaller than the exemplary resistance (146 ohms) mentioned above. A sensor having a resistance of the order of 400 ohms, for example, would be more independent of sensor lead length although, obviously, sensor resistance cannot be increased too much because of the correspondingly increased inertia in response. The same resistance ratio or proportion of manganin to nickel is, of course, maintained for the different total resistances of the manganin-nickel sensor. While the grid elements 52 and 56 shown in FIG. 6 are of different sizes, the elements 52 and 56 can each be changed in overall size by suitably varying the strand widths, thicknesses and/or spacings thereof. Thus, the manganin and nickel grid elements 52 and 56 can be made to be of the same overall size where required or desired.

Figure 11:
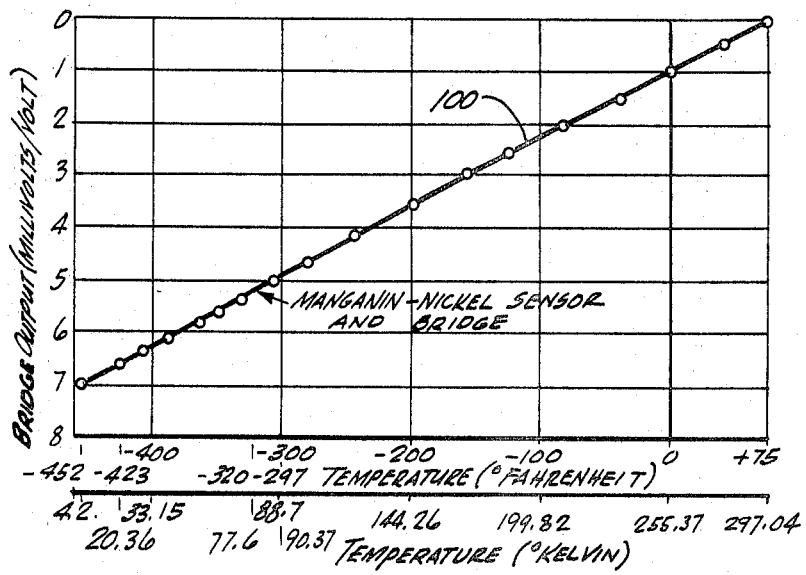
FIG. 11 is a graph showing a plot of bridge output versus temperature readings for the manganin-nickel temperature sensor of this invention.

FIG. 11 is a graph showing a plot of bridge output versus temperature readings for the bridge circuit 88 including the manganin-nickel temperature sensor 46 as shown in FIG. 10. The sensor 46 has a substantially linear response from over 200° F., approximately, down to at least −452° Such a characteristic is highly desirable because it simplifies the relationship between temperature and output, easing calibration and scaling requirements as well as eliminating a number of second-order electrical problems. The linear bridge circuit 88 provides an output which is illustrated by curve 100. It can be seen that the curve 100 is substantially a straight line. Bridge output is indicated in millivolts per volt. By increasing the voltage of the power supply 90, the bridge output in millivolts can be proportionately increased, as is well known.

FIG. 12A is an exploded perspective view of a second illustrative configuration or embodiment of a manganin-nickel temperature sensor 102 constructed according to this invention. In this instance, a manganin foil grid element 104 is positioned in parallel and adjacent to a nickel foil grid element 106. The adjacent electrical connections (adjacent grid ends) can be connected together by a foil bus bar 108 and the entire combination encapsulated in a thin film 110 of epoxy resin. Suitable electrical leads (not shown) are connected to the free electrical connections (grid ends) and extend out through the film 110. It can be seen that the manganin grid element 104 is of the same overall size as the nickel grid element 106.

FIG. 12B is a sectional view of the sensor 102 as taken along the line 12B–12B indicated in FIG. 12A. The manganin grid element 104 is located adjacent to and in the same plane as the nickel grid element 106. Both of the grid elements 104 and 106 are encapsulated in the thin film 110 of epoxy resin. The nominal composition by weight of the manganin grid element 104 is, of course, 12 percent manganese, 4 percent nickel and 84 percent copper, as before. Similarly, the nominal composition by weight of the nickel grid element 106 is 99.9 percent pure nickel. The grid elements 104 and 106 are connected in a series combination by the bus bar 108. If the resistance of the sensor 102 is, for example, 146 ohms, the resistance of the manganin grid element 104 would be 121 ohms and the resistance of the nickel grid element 106 would be 25 ohms. Thus, the resistance of the manganin grid element 104 is generally of the order of five times that of the nickel grid element 106.

FIG. 13A is an exploded perspective view of a third illustrative configuration or embodiment of this invention. A cryogenic linear temperature sensor 112 is formed from a manganin foil grid element 114 and two nickel foil grid elements 116 and 118 positioned adjacently on respective sides of the grid element 114, parallel and in the same plane thereto. The adjacent electrical connections of the grid elements 114 and 116 can be connected together by a foil bus bar 120, and the adjacent electrical connections of the grid elements 114 and 118 can be connected together by another foil bus bar 122. The nickel grid elements 116 and 118 are each positioned side-by-side to the manganin grid element 114. The resistance of the manganin grid element is 121 ohms, and the resistances of the nickel grid elements 116 and 118 are each 12.5 ohms, for example.

FIG. 13B is a sectional view of the sensor 112 as taken along the line 13B–13B indicated in FIG. 13A. Electrical leads (not shown) are connected to the free electrical connections (grid ends) of the grid elements 114, 116 and 118, and the entire combination is encapsulated in a thin film 124 of epoxy resin with the electrical leads extending out through the film 124, of course. The nickel grid elements 116 and 118 have convolutions 126 which are oriented generally at right angles to those of the manganin grid element 114. The convolutions 126 are essentially double-stranded whereas those of the grid element 114 are single-stranded. However, the more important aspect of the convolutions 126 is that their dimensions are such that about one-third of the amount of material (resistance) is positioned in the indicated Y direction and about two-thirds of the resistance is positioned in the indicated X direction. That is, the total length (summed incremental portions) of the convolutions 126 in the indicated Y direction is equal to approximately one-half of their total length in the indicated X direction.

Errors due to temperature gradients are reduced by the configuration of the sensor 112 shown in FIGS. 13A and 13B. The sensor 112 configuration also has reduced strain sensitivity. Nickel has a much higher output than manganin. By dividing the required amount of nickel and placing the halves at equal distances from the manganin grid element 114, errors due to temperature gradients across the width and length of the sensor 112 are reduced since most of the nickel material is distributed lengthwise on both sides of the manganin grid element 114. A better average of any existing temperature gradient is thus obtained. Although division of the nickel is preferred, the manganin obviously can be divided instead and placed at equal distances on both sides of an undivided nickel grid element for this purpose. Nickel is also the high strain-sensitive material. Therefore, strain effects on the nickel grid elements 116 and 118 having convolutions 126 would tend to cancel when the sensor 112 is in an axial strain field because approximately one-third of their resistance is in the axial direction (Y direction, generally, in FIG. 13A), and two-thirds of their resistance is in the Poisson's ratio transverse unit deformation direction (X direction, generally). Since the axial strain-field is the worse case condition, if the sensor 112 were located in any other strain field, its strain sensitivity would be generally much lower.

FIG. 14A is an exploded perspective view of a fourth illustrative configuration or embodiment of this invention. A cryogenic linear temperature sensor 128 is formed from a manganin foil grid element 130 stacked over a nickel foil grid element 132, and both elements are encapsulated in a thin film 134 of epoxy resin. The elements 128 and 130 are, of course, each separately encapsulated completely so as to be fully insulated from each other. The manganin and nickel elements 130 and 132 can be suitably formed whereby they can be positioned back-to-back in congruity in the sensor 128, separated only by the thin film 134. Electrical leads (not shown) are suitably connected to the electrical connections (grid ends) of the grid elements 130 and 132, and extend out through the encapsulating film 134.

FIG. 14B is a sectional view of the sensor 128 as taken along the line 14B–14B indicated in FIG. 14A. The manganin grid element 130 is separately encapsulated in an upper layer 134a of the thin film 134 of epoxy resin. Similarly, the nickel grid element 132 is separately encapsulated in a lower layer 134b of the thin film 134. As before, the resistance of the manganin grid element 130 is 121 ohms and the resistance of the nickel grid element 132 is 25 ohms, for example, for a temperature sensor which is linearly responsive from over 200° F. down through −452° F. and lower. It is apparent that the configuration of sensor 128 has the smallest overall size of the different configurations shown. There are, of course, various other configurations or embodiments in which this invention can be fabricated, and each of such configurations or embodiments may be more suited or adaptable for certain specific uses or purposes. For example, the manganin-nickel sensor of this invention can be used as an ideal (linear) control or compensating device in various processes or systems involving a wide range of temperatures including those down to almost absolute zero.

It should be noted that the composition of manganin given previously herein is a so-called "essential nominal chemical composition" and that relatively wide changes in the relative amounts of each ingredient of the composition could be made without departing from the required performance characteristics. As is well known, compositions such as manganin are produced in lots which match certain desired characteristics, and there may be considerable variations in composition between lots. The production process, in many respects, somewhat follows a trial and error approach. The specification and identification of the lot of manganin material actually used in the development of this invention was, for example, 9.1 percent to 13.3 percent manganese, 2.95 percent to 4.5 percent nickel, 0.08 to 0.7 percent iron (trade element) and the balance copper. The composition of the nickel grid element can also be significantly varied as that of the manganin grid element, though to a lesser extent. The nickel grid element could be properly described as a composition which is predominately nickel.

While some specific dimensions, values and types of materials have been disclosed in the foregoing description of my invention, such dimensions, values and types of materials were given as examples only and are not intended to limit the scope of this invention in any manner. It is, further, to be understood that the exemplary embodiments of the invention described above and shown in the accompanying drawings are merely illustrative of, and not restrictive on, my broad invention and that various changes in design, structure and arrangement may be made in these exemplary embodiments without departing from the spirit and scope of the invention.

I claim:

1. A cryogenic linear temperature sensor comprising:
   a manganin element; and
   a substantially pure nickel element, said manganin element having a room temperature resistance which is of the order of five times the room temperature resistance of said nickel element, and said manganin and nickel elements being connected in a series combination providing an electrical resistance which exhibits substantially equal increments of resistance change for equal increments of temperature change over a temperature range between room temperature of approximately +75° F. and a cryogenic temperature below at least −297° F.

2. The invention as defined in claim 1 wherein said manganin element is made of a nominal composition including, by weight, of the order of 9 to 13 percent manganese, 3 to 5 percent nickel and 82 to 88 percent copper, and said nickel element is made of a nominal composition including, by weight, of the order of 99 to nearly 100 percent pure nickel.

3. The invention as defined in claim 1 wherein said temperature sensor is operatively connected in one arm of a bridge circuit, said bridge circuit including a readout device and means for calibrating said readout device at predetermined room temperature and low cryogenic temperature indications while compensating for lead length from said temperature sensor and while said temperature sensor is at any temperature.

4. A cryogenic linear temperature sensor comprising:
   a manganin element; and
   a substantially pure nickel element, said manganin and nickel elements being connected in a series combination providing an electrical resistance which exhibits substantially equal increments of resistance change for equal increments of temperature change over a temperature range between room temperature of approximately +75° F. and a cryogenic temperature below at least −297° F., and wherein said manganin element is a thin grid element, and said nickel element is another thin grid element which is positioned back-to-back to said manganin grid element and further comprising a relatively flexible material thinly encapsulating and insulating each of said grid elements.

5. A cryogenic linear temperature sensor comprising:
   a manganin element; and
   a substantially pure nickel element, said manganin and nickel elements being connected in a series combination providing an electrical resistance which exhibits substantially equal increments of resistance change for equal increments of temperature change over a temperature range between room temperature of approximately +75° F. and a cryogenic temperature below at least −297° F., and wherein said manganin element is a grid element, and said nickel element is another grid element which is positioned side-by-side to said manganin grid element and further comprising a relatively flexible material thinly encapsulating said grid elements.

6. The invention as defined in claim 5 wherein one of said grid elements is divided substantially into two halves which are respectively positioned on two opposite sides of the other of said grid elements whereby a better average of any temperature gradient existing over said sensor can be obtained.

7. The invention as defined in claim 6 wherein said manganin grid element has convolutions which are generally oriented in a first direction, and said nickel grid element is divided into halves each having convolutions which are generally oriented in a second direction that is at right angles to the convolutions of said manganin grid element.

8. The invention as defined in claim 7 wherein the convolutions of said nickel grid element halves have dimensions such that about one-third of the resistance thereof is generally in said first direction, and about two-thirds of the resistance thereof is in said second direction generally at right angles to said first direction whereby when said first direction is oriented in an axial strain field parallel to its axis, strain effects on said nickel grid element halves tend to be canceled.

9. A cryogenic linear temperature sensor comprising:
   a manganin element; and
   a substantially pure nickel element, said manganin element being made of a nominal composition including, by weight, of the order of 9 to 13 percent manganese, 3 to 5 percent nickel and 82 to 88 percent copper, and said nickel element being made of a nominal composition including, by weight, of the order of 99 to nearly 100 percent pure nickel, said manganin element having a room temperature resistance which is in a range of approximately 5 ±½ times the room temperature resistance of said nickel element, and said manganin and nickel elements being connected in a series combination providing an electrical resistance which exhibits substantially equal increments of resistance change for equal increments of temperature change over a temperature range between a room temperature of approximately +75° F. and a cryogenic temperature of at least −452° F.